Feb. 6, 1940. C. E. WEAVER 2,189,094
VALVE FOR CONTROLLING LANDING GEAR OF AIRCRAFT
Filed Feb. 17, 1938 4 Sheets-Sheet 1
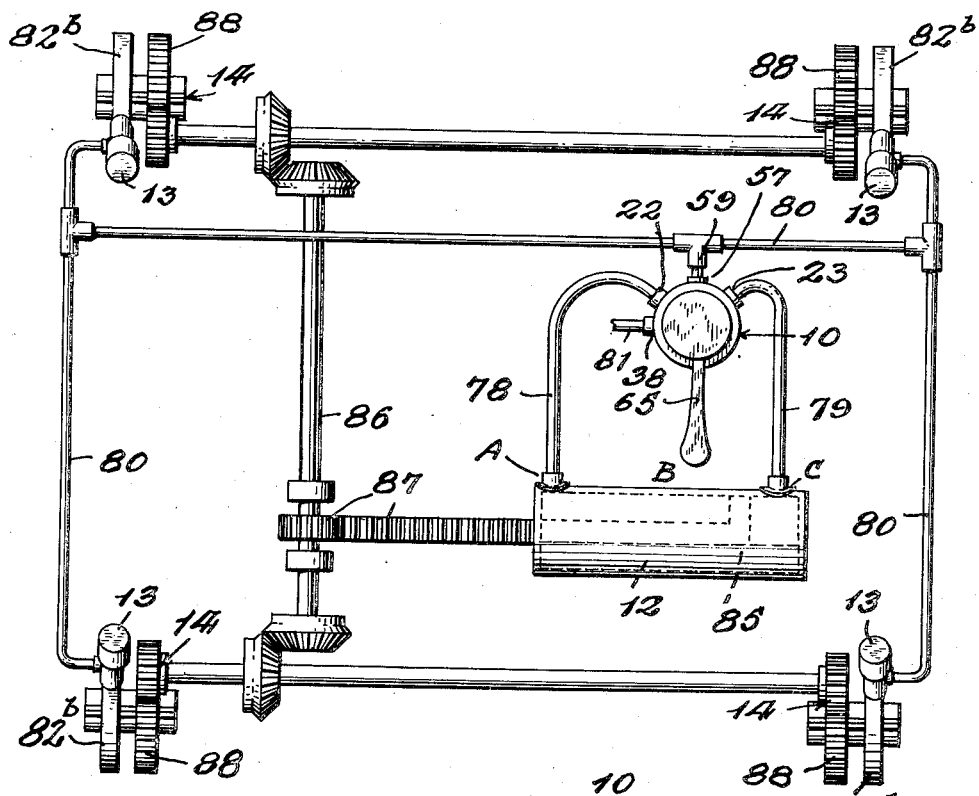
Fig. 1.
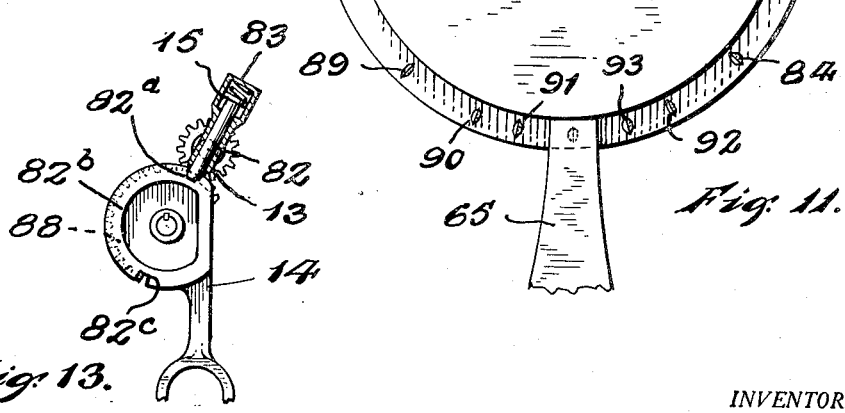
Fig. 13.
Fig. 11.
INVENTOR:
CHARLES E. WEAVER,
BY:
Christian R. Nielsen
ATTORNEY.

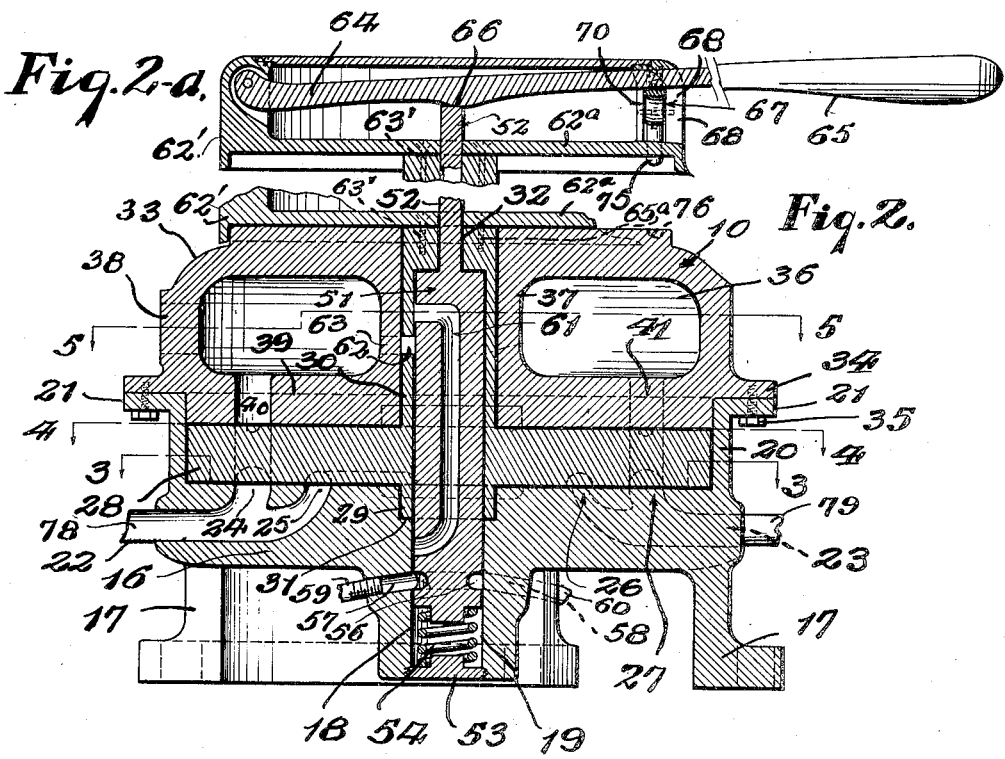
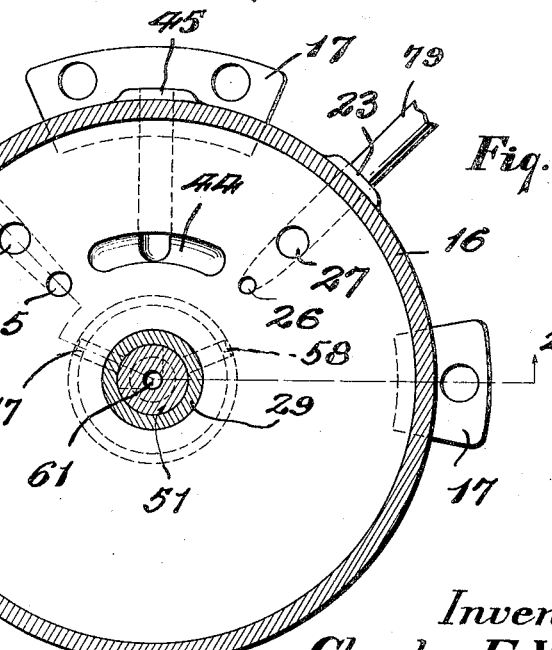

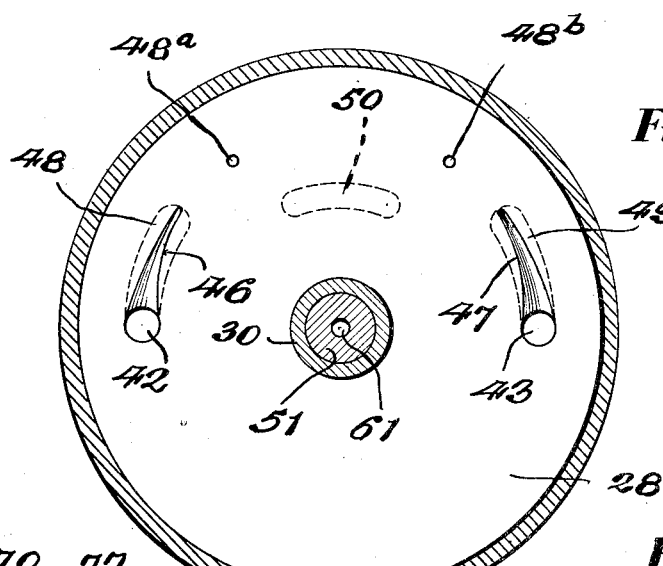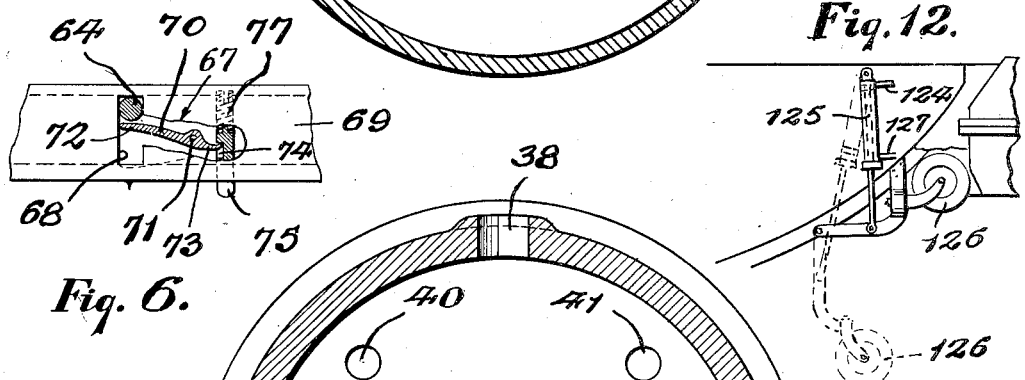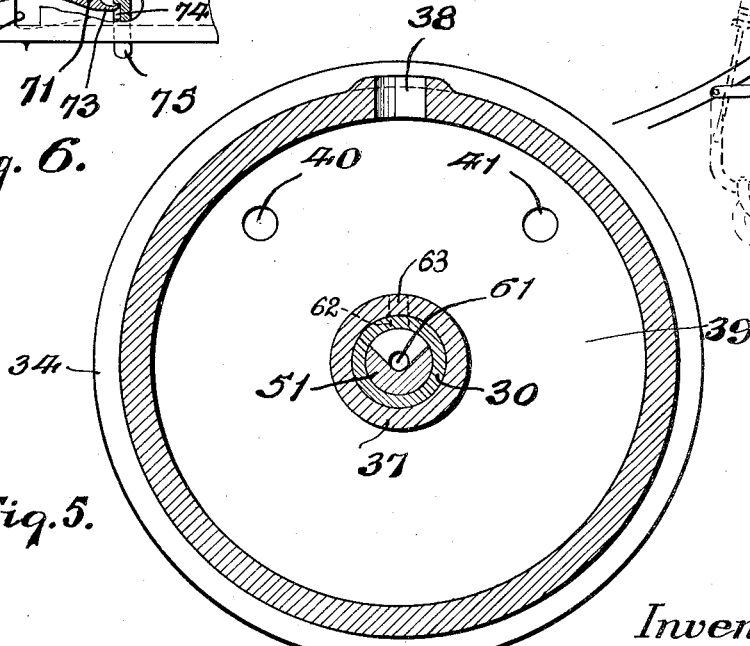

Feb. 6, 1940. C. E. WEAVER 2,189,094
VALVE FOR CONTROLLING LANDING GEAR OF AIRCRAFT
Filed Feb. 17, 1938 4 Sheets-Sheet 4
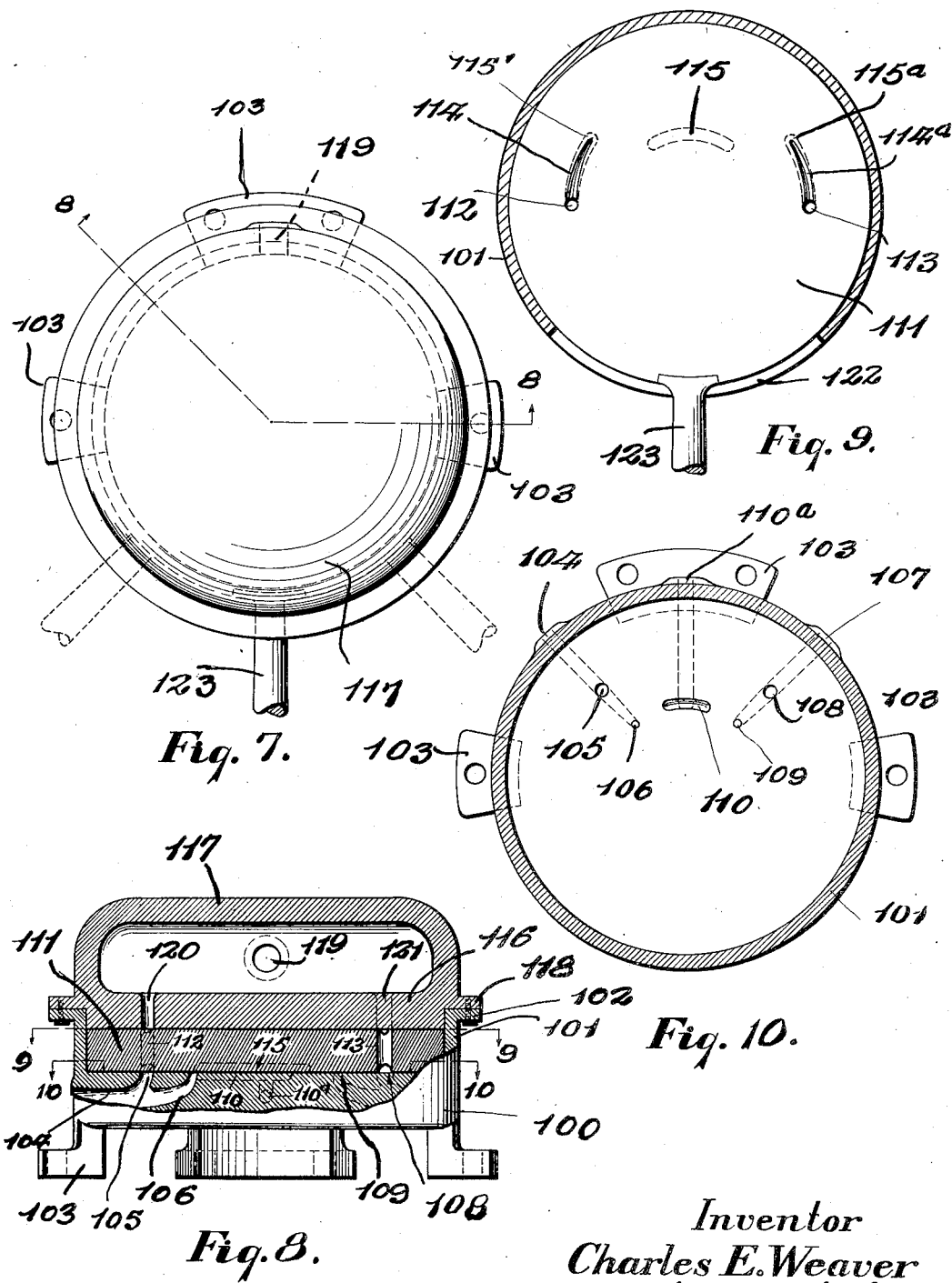
Inventor
Charles E. Weaver
Per Christian K. Nielsen
Attorney

UNITED STATES PATENT OFFICE 2,189,094

VALVE FOR CONTROLLING LANDING GEAR OF AIRCRAFT

Charles E. Weaver, Watertown, N. Y.

Application February 17, 1938, Serial No. 191,084

9 Claims. (Cl. 277—50)

This invention relates to valve means for control of landing gear of aircraft and it consists in the constructions, arrangements and combinations herein described and claimed.

It is an object of the invention to provide a valve construction for remote control of fluid means under pressure for actuating mechanism to a desired position.

It is a further object of the invention to provide a valve of novel construction which may be readily actuated to positively move the landing gear to a taxiing, a water-landing, or to a retracted position.

It is a further object of the invention to provide a valve in which the valve proper is movable to the various operative positions by means of a single control lever, and maintained in such position until positively moved by the operator.

Additional objects, advantages and features of invention will be apparent from the following de- description and accompanying drawings, wherein—

Figure 1 is a diagrammatic view of the valve illustrating its connection with the operating piston and cylinder.

Figure 2 is a vertical section through the valve.

Figure 2a is a detail of the valve operating means.

Figure 3 is a cross section on the line 3—3 of Figure 2.

Figure 4 is a cross section on the line 4—4 of Figure 2.

Figure 5 is a cross section on the line 5—5 of Figure 2.

Figure 6 is a detail view of the detent means for the actuating handle.

Figure 7 is a top plan view of a valve for control of the fifth or taxi wheel of an aircraft.

Figure 8 is a cross section on the line 8—8 of Figure 7.

Figure 9 is a cross section on the line 9—9 of Figure 8.

Figure 10 is a cross section on the line 10—10 of Figure 8.

Figure 11 is a fragmentary top plan view of the valve.

Figure 12 is a side elevation of the fifth wheel control.

Figure 13 is a vertical sectional view through one of the air locks.

Attention is first invited to Figures 1 to 6 wherein I have illustrated a practical installation and construction of the main control valve, especially adapted for control of landing gear of air craft as set forth in my pending application filed November 30, 1937, Serial Number 177,363.

There is illustrated in Figure 1 the control valve 10 having an operating lever 65 for control of fluid, under pressure, to the actuator cylinder 12, the latter being associated with cylinders 13 of respective landing gear 14 of the aircraft, the movement of the piston 15, controlled by the valve 10 determining the movement of the gear means 14, as will be understood as the description proceeds.

Referring particularly to Figure 2, the valve 10 comprises a base 16 having apertured foot members 17 for attachment to the dash of the craft, in easy access of the pilot. The base 16 is preferably in the form of a casting having a medial bore 18, a depending boss 19, and an annular circumscribing upwardly directed flange 20 and a horizontal flange 21 affording means for attachment of an upper portion of the valve, which will be understood as the description proceeds.

The base 16 is of substantial thickness, and extending radially therefrom are ports 22 and 23, each of which terminates in branched ports 24 and 25 and 26 and 27 respectively, the ports 22 and 23 being threaded for connection with the actuator cylinder 12 as will be described.

The flange 20 extends a distance above the upper face of the base 16, and the ports 24—25— 26 and 27 open thereupon, and revolubly seated upon the face within the flange 20 there is a rotatable disk valve 28. The valve 28 comprises oppositely disposed hollow trunnions 29 and 30, the former seating within an annular recess 31 of the base 16, while the trunnion 30 extends upwardly flush with the top of the valve for a purpose presently to be explained, and it will be seen from a consideration of Figure 2 that the trunnion terminates in a reduced angular aperture 32 for mounting of a plug valve, as will be explained hereinafter.

The valve 28 is of a thickness less than the height of the flange 20, affording a snug seating engagement of a head member 33, the lower face of which seats upon the upper face of the disk valve 28, the head member being held in such position by virtue of an annular flange 34 complemental to the flange 21 of the base, the two flanges being apertured and threaded for reception of fastening bolts 35.

The head member 33 comprises an annular chamber 36 defined by an outer wall and a central boss 37 of a diameter circumscribing the trunnion 30 of the valve 28 and the upper wall of the chamber 36 terminates flush with the trunnion, as clearly shown in Figure 2. The head member 33 has an air port 38 establishing connection with a suitable source of air supply although other means of fluid pressure may be employed, as desired or found practical.

The bottom wall 39 has a pair of spaced ports 40—41 formed therein, in alignment with ports 24 and 27 respectively, and will be brought into selective registry with respective ports 42—43 formed in the valve disk whene the disk is rotated.

Attention is now invited to Figure 3 wherein it is shown that the upper face of the base 16 has an arcuate shaped groove 44 disposed in alignment with ports 25 and 26, and an exhaust port 45 leading from the groove 44, the function of which will be explained hereinafter.

It will be noted that the ports 42 and 43 of the valve 28 have rearwardly tapering recesses 46 and 47, the recesses extending concentric with the valve 28, and upon the underside of the valve 28 the ports 42 and 43 have semi-circular grooves 48 and 49 extending in the same direction as the recesses 46 and 47 and of the same length. There is also a groove 50 positioned to register selectively with ports 25—44 or ports 26 and 44.

For the purpose of equalizing pressure in the cylinder 12, a port 48a and 48b is formed in the valve 28, the port 48a establishig connection with the port 40 at times, and the port 48b establishing communication with port 41 when the valve 28 is rotated.

A rotatable and reciprocable plug valve 51 is mounted in the bore 18 and trunnions 29 and 30, the valve having a squared upper end 52 complemental to the aperture 32, the end terminating well outwardly of the valve proper. The body of the valve 51 is of lesser length than the bore 18 stopping inwardly thereof, the boss 19 being interiorly threaded to receive a screw plug 53. A helical spring 54 is seated between the plug 53 and the lower end of the valve to retain the valve in its uppermost position, the spring being yieldable however to permit downward longitudinal movement of the valve at times.

Adjacent the lower end of the valve 51 a circumscribing groove 56 is formed normally in registry with ports 57 and 58, the latter being threaded for coupling of pipes 59 and 60 respectively.

Extending axially of the valve 51 there is a port 61, the upper end opening upon the periphery of the valve for registry at times with ports 62 and 63 of the trunnion 30 and central boss 37 respectively. The lower end of the port 61 also opens upon the periphery of the valve and registers with the port 57 when the valve is depressed. When the valve 51 is depressed the port 58 will be closed, and is in communication with the groove 56 only in such position of the valve as to exhaust air from the air release locks.

In Figure 2a, I have illustrated a means for operating the valves 28 and 51, and this consists in a cap 62', the base plate 62a being axially apertured to receive the squared end 52 of the valve 51 therethrough, the plate 62a lying flush upon the upper face of the head member 33 and is secured to the trunnion 30 of the disk valve, as at 63'.

Hinged to one side of the cap for vertical swinging movement there is a lever 64 of a length extending beyond the cap, terminating in a handle 65. The lever 64 contacts the upper end of the reduced stem 52 and preferably has a cam face 66 which functions to effect downward movement of the plug valve 51 upon downward movement of the lever 65.

It should be noted that since the cap 62' is rigidly connected with the trunnion 30 by means of the bolts or other fastenings 63', the disk valve 28 may be rotated by means of the lever 65 to cause registration of the various ports. However, in order that accidental movement of the lever 65 may not be affected, I provide a safety detent, generally indicated at 67 as clearly shown in Figure 6.

Referring particularly to Figure 6, the lever 64 is shown as projecting through a vertical slot 68 formed in the wall 69 of the cap, permitting vertical movements of the lever in order to effect reciprocation of the plug valve 51. A dog 70 is pivoted upon a pin 71 in the wall 69, one end 72 lying in the path of the lever 64, the other end 73 being shaped to engage a notch 74 of a spring-pressed detent pin 75 suitably mounted in the wall 69. The pin 75 normally projects through an aperture formed in the plate 62a of the cap so as to selectively engage hollow or recessed portions 76 (see Fig. 2) suitably spaced and formed in the upper wall of the head member 33, the spring 77 normally projecting the pin into one of the recesses 76. Obviously, the cap will be positively held against accidental rotation, and may only be released by a downward movement of the lever 65 which movement will cause retraction of the pin 75.

The operation

The operation will be readily understood from the following description, attention first being directed to Figure 1 for an understanding of the pipe connections between the actuator cylinder 12, the valve 10 and the landing gear air locks 13. The port 22 is connected with one end A of the cylinder 12 by a pipe 78; the port 23 being connected to the opposite end C of the cylinder by a pipe 79; the air locks 13 being connected for simultaneous distribution of air by pipes 80 connected with the port 57; and air under pressure being supplied to the valve 10 through pipe 81 connected to the port 38 of the air chamber 36.

Starting from ground position of the landing gear 14, the latter being locked against movement by the plunger 82 which is engaged in a notch 82a of a locking segment 82b of the air locks 13 and the control lever 65 in a central position, all ports of the valve 10 are closed.

Now, the control lever 65 is moved downwardly through the slot 68 the full length thereof, effecting a camming action on the stem 52 of the valve 51, moving the valve downwardly connecting port 61 of the valve with ports 62 and 63, establishing a communication with the air chamber 36, thus forming a direct connection with port 57 permitting air to pass by way of pipes 80 to the air locks 13 causing outward movement of the plungers 82 against the action of springs 83. The landing gear 14 is thus free to move. The movement of the lever 65 automatically disengages the pin 75, allowing rotary movement of the cap 62' but obviously, this rotary movement cannot be effected until the pin has been retracted and the air locks released.

To raise or retract the landing gear 14, the lever 65 being held in its lowermost position, the lever is moved to the right to a position of approximately 45 degrees to the indicator mark 84 (see Figure 11), which movement rotates the disk valve 28 to register ports 41—43 and 27, permitting air to pass through port 23 and pipe 79 to port at the end C of the cylinder 12. Exhaust of air from the cylinder passes from end A by way of pipe 78 to port 22 of the valve base, then through port 25, through recess 50 in the lower side of the disk valve to port 44 in the valve base, and thence through exhaust connection 45. This completes one cycle of movement of the landing gear, from ground to retracted position, and in the meantime, the piston 85 has travelled from end C to A of the cylinder 12, imparting rotation of the shaft 86 by virtue of the rack and gear 87. The shaft 86 is suitably geared to the gear segments 88 of the landing gear, and obviously, the latter will be moved to retracted locked position when the plunger 82 engages the notch 82c of the locking segment.

The reverse cycle, or from retracted to ground position, is similar to the one already described. Starting from the zero or central position of the lever 65, the lever is moved downwardly, disengaging the pin 75. This movement urges the valve 51 down so that the ports 61—62—63 register with the air chamber 36, and at the lower end of the valve 51, port 61 registers with port 57 in the base. With the ports thus registered air will pass through the pipes 80 to release the air locks 13 permitting movement of the landing gear 14. The ports named are maintained in registry and the control lever 65 is moved to the left, approximately 45 degrees to the indicator mark 89. Such movement will rotate the disk valve 28 to register ports 40—42 and 24, and air from the chamber 36 passes through ports 40, the tapered recess 46, port 42, lower recess 48 and 24 through pipe 78 to the end A of the actuator cylinder 12. At this position of the parts, air exhausts from the opposite end (C) of the cylinder 12 by way of pipe 79 to port connection 23, the air passing up through port 26 to recess 50, thence to recess 44 and to pipe connection at the outlet port 45. In the meantime, piston 85 has travelled from A back to C, and the return cycle is completed.

For positioning the landing gear in a water-landing position, starting with the landing gear in a retracted position, the control lever 65 being at the zero position, the lever 65 is moved downwardly as in the previous operations, and moved slowly to the left about 25 degrees to the indicator mark 90. The lever 65 is now moved back to the right to the indicator position 91 to an equalizing position. With this position of the parts, exhaust ports are closed and the cylinder 12 is admitting air through both pipes 78—79 and the piston 85 will be at a medial position of the cylinder as indicated by the reference character B, the end A of the cylinder admitting air through port 40, the tapered recess 46, the port 24 and pipe 78. Air is admitted to the C end of the cylinder through port 41, the equalizing ports 48b, port 27 and the pipe 79.

The landing gear can also be brought from ground position to central or water position, by moving the control handle from central or zero position to the right about 25 degrees and then back to the right hand equalizing position, these positions of the lever 65 being determined by the indicator marks 92—93.

The object of the equalizing point is that when the wheels of the landing gear are on the water or in a horizontal position, a semi-rigid means for maintaining them in such position is provided, when desired, and still permitting flexibility to prevent sudden strain on the landing gear such as would be caused by rough water, any shock being absorbed by the piston in a cushion-effect. Also a slight movement of the control lever 65 gives a selective range of height of wheels above or below the horizontal, and the equalizing ports maintain them in that position.

In Figures 7 to 10, I have illustrated a construction of valve for control of the fifth or taxiing wheel, and for an understanding of the construction and operation, attention is now invited to these figures. It will be noted that the valve here shown and presently to be described, is very similar to that previously described.

The construction comprises a base 100 of substantial thickness embodying a circumscribing upstanding flange 101 and an annular flange 102. The base 100 includes legs 103 for mounting of the valve upon the dash.

A port 104 is formed in the base having branched ports 105 and 106 and a similar port 107 is provided, having ports 108 and 109, each of the ports 105—106 and 108—109 opening upon the upper face of the base 100. An annular recess 110 is also formed in the upper face of the base 100, forming communication with an exhaust port 110a.

A disk valve 111 is rotatably seated within the upstanding flange 101 and comprises a port 112 and a similar port 113. Each of the ports 112 and 113 includes a tapering recessed groove 114 and 114a respectively. The underface of the valve 111 has a recess 115 complemental to the recess 110, and further includes recesses 115a and 115' complemental to the ports 112 and 113 of the valve.

The disk valve 111 is of a thickness less than the height of the flange 101 affording a seat for a rabbeted bottom wall 116 of an air chamber 117. The chamber 117 comprises a flange 118 adapted to seat upon the flange 102 and be secured thereto by bolts or otherwise.

The air chamber 117 includes an inlet port 119 and air inlet ports 120—121 adapted to register with ports 112 and 113, respectively, at times.

The wall 101 is cut away as at 122 a suitable distance of its circumference to permit movement of an operating handle 123 integrally connected with the valve 111.

The port 104 is connected by means of pipe 124 with cylinder 125 and port 107 is connected with cylinder 125 by pipe 127.

The operation in this form of valve is substantially as previously described, that is to say, rotation of the handle 123 in a counterclockwise direction will admit air to the cylinder 125 by way of pipe 124 to lower the fifth wheel 126 and clockwise rotation of the handle 123 will admit air to the cylinder to raise the fifth wheel, by way of pipe 128.

While I have shown and described a preferred construction and application of the valve to control of landing gear of air craft, this is by way of illustration only, and I consider as my own all such modifications in structure and use as fairly fall within the scope of the appended claims.

I claim:

1. A valve for control of landing gear of air craft comprising a base having an annular upstanding flange, a disk valve rotatably mounted upon the upper face of the base within the flange, a pair of air ports in the base, each port having branched ports opening upon the valve, the valve having ports in registry with the branched ports of the base at times, an air pressure chamber fixed to the flange, the air pressure chamber having an axial hub defining a bore for receiving a hub of the disk valve therethrough and further having air ports in the bottom wall thereof for registry with ports of the disk valve at times, a reciprocable valve within the hub of the disk valve, aligned ports between the hub of the air chamber and the hub of the disk valve, said reciprocable valve having an axial port terminating in laterally extended ports, one of the ports adapted to register with aligned ports of the hubs of the air chamber and disk upon reciprocation of the reciprocating valve, and a port formed in the base adapted to align with the other laterally extended port upon reciprocation of the valve.

2. The structure of claim 1, in which a single control lever effects operation of the disk and reciprocating valves.

3. A valve for control of landing gear of air craft comprising a base having an annular upstanding flange, a disk valve rotatably mounted upon the upper face of the base within the flange, a pair of air ports in the base, each port having branched ports opening upon the valve, the valve having ports in registry with the branched ports of the base at times, an air pressure chamber fixed to the flange, the air pressure chamber having an axial hub defining a bore for receiving a hub of the disk valve therethrough and further having air ports in the bottom wall thereof for registry with ports of the disk valve at times, a reciprocable valve within the hub of the disk valve, aligned ports between the hub of the air chamber and the hub of the disk valve, said reciprocable valve having an axial port terminating in laterally extended ports, one of the ports adapted to register with aligned ports of the hubs of the air chamber and disk upon reciprocation of the reciprocating valve and a port formed in the base adapted to align with the other laterally extended port upon reciprocation of the valve, a cap member upon the air chamber rotatable therearound, the cap member being secured to the hub of the disk valve, said reciprocating valve having a squared shank extended through the base plate of the cap member and terminating within the cap member, a vertically swinging lever mounted within the cap member, the lever having a cam face cooperable with the upper end of the shank and means for holding the cap member against rotation, said lever including means for releasing the holding means upon downward swinging movement.

4. The structure of claim 3 in which the holding means comprises a reciprocable spring-pressed pin adapted to engage spaced apertures in the upper wall of the air chamber, a dog pivoted on the cap, one end engaging the pin, the other end being disposed in the path of movement of the lever.

5. The structure of claim 3, in which the ports of the disk valve comprise circumferentially extended recesses.

6. The structure of claim 1 in which the base member comprises an exhaust port and a circumferentially extended recess, the disk valve having a recess complemental thereto at times.

7. A valve for control of landing gear of air craft comprising a base having an annular upstanding flange, a disk valve rotatably mounted upon the upper face of the base within the flange, a pair of air ports in the base, each port having branched ports opening upon the valve, the valve having ports for registry with the branched ports of the base at times, an air pressure chamber fixed to the flange, the air pressure chamber having an axial hub defining a bore for receiving a hub of the disk valve therethrough, and further having air ports in the bottom wall thereof for registry with ports of the disk valve at times, a reciprocable valve within the hub of the disk valve, aligned ports between the hub of the air chamber and the hub of the disk valve, said reciprocable valve having an axial port terminating in laterally extended ports, one of the ports adapted to register with aligned ports of the hubs of the air chamber and disk upon reciprocation of the reciprocating valve, said base having a downwardly extended boss, ports formed in the boss, spring means in the boss for engaging the lower end of the reciprocating valve for maintaining the valve in normal position, said valve having a circumscribing groove in registry with the ports of the boss when the valve is in its normal position, and the other of said lateral ports of the reciprocating valve adapted to register with one of the ports of the boss upon reciprocation of the valve.

8. In a valve for control of a taxiing wheel of an aircraft comprising a base having a pair of air ports including branched ports, said ports opening upon the upper face of the base member, the base having an upstanding circumscribing flange, a disk valve oscillatably seated within the flange, an operating handle integrally connected with the valve, an air chamber mounted above and in snug engagement with the upper face of the disk valve, said chamber having an air intake port, the lower face of the chamber having a pair of ports, the disk valve having a pair of arcuately shaped ports adapted to register with the last named ports and one of the branched ports of the base member, an arcuately disposed recess in the underside of the disk valve adapted to register with a similarly disposed port of the base member, and an exhaust port in communication with the last named ports.

9. The structure of claim 8 in which the arcuately disposed ports of the disk valve include tapering extensions.

CHARLES E. WEAVER.